US012782295B2

(12) United States Patent
Koch et al.

(10) Patent No.: US 12,782,295 B2
(45) Date of Patent: Nov. 3, 2026

(54) METHOD AND APPARATUS FOR USING RADIATION IMAGING DATA TO ANALYZE COMPONENTS

(71) Applicant: RTX CORPORATION, Farmington, CT (US)

(72) Inventors: Robert Koch, Hartford, CT (US); Iuliana Cernatescu, Glastonbury, CT (US); Christopher Pelliccione, Tolland, CT (US); Ryan Breneman, Newington, CT (US); David Furrer, Marlborough, CT (US)

(73) Assignee: RTX CORPORATION, Farmington, CT (US)

( * ) Notice: Subject to any disclaimer, the term of this patent is extended or adjusted under 35 U.S.C. 154(b) by 165 days.

(21) Appl. No.: 18/654,776

(22) Filed: May 3, 2024

(65) Prior Publication Data

US 2024/0369500 A1 Nov. 7, 2024

Related U.S. Application Data

(60) Provisional application No. 63/464,468, filed on May 5, 2023.

(51) Int. Cl.
*G01N 23/04* (2018.01)
*G01N 23/203* (2006.01)

(52) U.S. Cl.
CPC ........... *G01N 23/04* (2013.01); *G01N 23/203* (2013.01); *G01N 2223/053* (2013.01);
(Continued)

(58) Field of Classification Search
CPC ..................................................... G01N 23/04
See application file for complete search history.

(56) References Cited

U.S. PATENT DOCUMENTS

| | | | |
|---|---|---|---|
| 9,589,098 | B2 | 3/2017 | Srivastava et al. |
| 10,976,267 | B2 | 4/2021 | Fujita et al. |

(Continued)

FOREIGN PATENT DOCUMENTS

| | | |
|---|---|---|
| EP | 3798624 | 3/2021 |

OTHER PUBLICATIONS

Wong et al., "A framework for generating synthetic diffraction images from deforming polycrystals using crystal-based finite element formulations", Computational Materials Science, vol. 77, Jun. 4, 2013, pp. 456-466.

(Continued)

*Primary Examiner* — Edwin C Gunberg
(74) *Attorney, Agent, or Firm* — Carlson, Gaskey & Olds, P.C.

(57) ABSTRACT

An example method includes obtaining one or more three dimensional computer models that model geometric and material properties of a component, and model beam properties of a beam of radiation to be applied to the component; utilizing the one or more three dimensional computer models to obtain simulated radiation imaging data, which includes simulated elastic scattering data, resulting from a simulated application of the beam having the beam properties on a plurality of discretized samples of the component, and which accounts for sequential interactions of rays of the beam with multiple ones of the plurality of discretized samples; obtaining actual radiation imaging data, which includes actual elastic scattering data, of an output beam pattern caused by application of a non-simulated beam of radiation having the beam properties to the component; and performing at least one of: determining whether an anomaly exists in a crystalline structure of the component based a comparison of the simulated elastic scattering data to the actual elastic scattering data; and modifying the actual (Continued)

radiation imaging data based on the simulated elastic scattering data to at least partially remove the actual elastic scattering data from the actual radiation imaging data. A corresponding system is also disclosed.

20 Claims, 9 Drawing Sheets

(52) U.S. Cl.
CPC . *G01N 2223/323* (2013.01); *G01N 2223/401* (2013.01); *G01N 2223/601* (2013.01)

(56) References Cited

U.S. PATENT DOCUMENTS 11,099,143 B2 8/2021 Griffiths et al.
2020/0225171 A1* 7/2020 Griffiths ............. G01N 29/0681

OTHER PUBLICATIONS

European Search Report for European Patent Application No. 24174169.3 Dated Oct. 7, 2024.

* cited by examiner

METHOD AND APPARATUS FOR USING RADIATION IMAGING DATA TO ANALYZE COMPONENTS

CROSS-REFERENCE TO RELATED APPLICATIONS

This application claims the benefit of Provisional U.S. Provisional Patent Application No. 63/464,468 filed May 5, 2023; the disclosure of which is incorporated by reference in its entirety herein.

BACKGROUND

This application relates to component inspection, and more particularly to a method and apparatus for using radiation imaging data to analyze a component.

In connection with an aircraft, single-crystal (SX) superalloy components are known to provide beneficial mechanical properties at high temperatures necessary for efficient engine operation. However, during the manufacture of such components, there are several crystallographic anomalies that may be realized. Such anomalies may include recrystallized grains (RX), secondary grains, freckles, slivers grains, and misaligned primary dendrite.

In instances where anomalies, especially RX, occur in the interior of the component or on a region which is covered by a coating, the detection of the anomalies by non-destructive techniques (with respect to the component) is not possible with conventional technology.

SUMMARY

A method according to an example embodiment of the present disclosure includes obtaining one or more three dimensional computer models that model geometric and material properties of a component, and model beam properties of a beam of radiation to be applied to the component; utilizing the one or more three dimensional computer models to obtain simulated radiation imaging data, which includes simulated elastic scattering data, resulting from a simulated application of the beam having the beam properties on a plurality of discretized samples of the component, and which accounts for sequential interactions of rays of the beam with multiple ones of the plurality of discretized samples; obtaining actual radiation imaging data, which includes actual elastic scattering data, of an output beam pattern caused by application of a non-simulated beam of radiation having the beam properties to the component; and includes performing at least one of determining whether an anomaly exists in a crystalline structure of the component based a comparison of the simulated elastic scattering data to the actual elastic scattering data, and modifying the actual radiation imaging data based on the simulated elastic scattering data to at least partially remove the actual elastic scattering data from the actual radiation imaging data.

In a further embodiment of the foregoing embodiment, the beam properties that are modeled by the one or more three dimensional computer models include one or more of an energy spectrum of the beam, a shape of the beam, an axial divergence of the beam, a distance between the component and a source of the beam, and ray tracing data of the beam.

In a further embodiment of any of the foregoing embodiments, the geometric properties of the component that are modeled by the one or more three dimensional computer models include one or more of a material density of the component, a chemical composition of the component, an orientation of the component with respect to the non-simulated radiation beam, spatial coordinates and a size of each discretized sample of the component, and which locations of the component are to be analyzed.

In a further embodiment of any of the foregoing embodiments, the geometric properties of the component that are modeled by the one or more three dimensional computer models also include one or more of a crystalline structure of the component, including a lattice and basis of the crystalline structure, an orientation of crystals of the component with respect to a unified reference frame, a permissible grain divergence of the component, and a structure factor of the component.

In a further embodiment of any of the foregoing embodiments, the simulated diffraction pattern includes one or more of the following for each of the plurality of discretized samples: a brightness of a refracted beam, and an angle of the refracted beam relative to a unified reference frame.

In a further embodiment of any of the foregoing embodiments, the utilizing the one or more three dimensional computer models to obtain a simulated diffraction pattern includes utilizing at least one of Bragg's Equation and an Ewald Construction to simulate an elastic scattering event caused by application of the beam to each discretized sample of the component.

In a further embodiment of any of the foregoing embodiments, the modifying the actual radiation imaging data based on the simulated elastic scattering data to at least partially remove the actual elastic scattering data includes subtracting the simulated elastic scattering data from the actual radiation imaging data.

In a further embodiment of any of the foregoing embodiments, the subtracting the simulated elastic scattering data from the actual radiation imaging data includes, for each of a plurality of groups of one or more pixels, subtracting the intensity of the simulated elastic scattering data from the actual radiation imaging data of the group of one or more pixels.

In a further embodiment of any of the foregoing embodiments, the method includes displaying the modified actual elastic scattering data on an electronic display.

In a further embodiment of any of the foregoing embodiments, the component includes one or more superalloy components.

In a further embodiment of any of the foregoing embodiments, the component includes one or more single-crystal (SX) superalloy components.

In a further embodiment of any of the foregoing embodiments, the performing at least one of the determining and the modifying includes performing the determining.

In a further embodiment of any of the foregoing embodiments, the performing at least one of the determining and the modifying includes performing the modifying.

A system according to an example embodiment of the present disclosure includes a computing device having processing circuitry operatively connected to memory. The processing circuitry is configured to obtain one or more three dimensional computer models that model geometric and material properties of a component, and model beam properties of a beam of radiation to be applied to the component; utilize the one or more three dimensional computer models to obtain simulated radiation imaging data, which includes simulated elastic scattering data, resulting from a simulated application of the beam having the beam properties on a plurality of discretized samples of the component, and which accounts for sequential interactions of rays of the beam with multiple ones of the plurality of discretized samples; obtain actual radiation imaging data, which includes actual elastic scattering data, of an output beam pattern caused by application of a non-simulated beam of radiation having the beam properties to the component; and perform at least one of determining whether an anomaly exists in a crystalline structure of the component based a comparison of the simulated elastic scattering diffraction data to the actual elastic scattering data, and modifying the actual radiation imaging data based on the simulated elastic scattering data to at least partially remove the actual elastic scattering data from the actual radiation imaging data.

In a further embodiment of the foregoing embodiment, the beam properties that are modeled by the one or more three dimensional computer models include one or more of an energy spectrum of the beam, a shape of the beam, an axial divergence of the beam, a distance between the component and a source of the beam, and ray tracing data of the beam.

In a further embodiment of any of the foregoing embodiments, the geometric properties of the component that are modeled by the one or more three dimensional computer models include one or more of a material density of the component, a chemical composition of the component, an orientation of the component with respect to the non-simulated radiation beam, spatial coordinates and a size of each discretized sample of the component, and which locations of the component are to be analyzed.

In a further embodiment of any of the foregoing embodiments, the geometric properties of the component that are modeled by the one or more three dimensional computer models also include one or more of a crystalline structure of the component, including a lattice and basis of the crystalline structure, an orientation of crystals of the component with respect to a unified reference frame, a permissible grain divergence of the component, and a structure factor of the component.

In a further embodiment of any of the foregoing embodiments, the simulated diffraction pattern includes one or more of the following for each of the plurality of discretized samples: a brightness of a refracted beam and an angle of the refracted beam relative to a unified reference frame.

In a further embodiment of any of the foregoing embodiments, to utilize the one or more three dimensional computer models to obtain a simulated diffraction pattern, the processing circuitry is configured to utilize at least one of Bragg's Equation and an Ewald Construction to simulate an elastic scattering event caused by application of the beam to each discretized sample of the component.

In a further embodiment of any of the foregoing embodiments, to modify the actual radiation imaging data based on the simulated elastic scattering data to at least partially remove the actual elastic scattering data, the processing circuitry is configured to subtract simulated elastic scattering data from the actual radiation imaging data.

In a further embodiment of any of the foregoing embodiments, to subtract the simulated elastic scattering data from the actual radiation imaging data, the processing circuitry is configured to, for each of a plurality of groups of one or more pixels, subtract the intensity of the simulated elastic scattering data from actual radiation elastic scattering data of the group of one or more pixels.

In a further embodiment of any of the foregoing embodiments, the processing circuitry is configured to display the modified actual elastic scattering data on an electronic display.

In a further embodiment of any of the foregoing embodiments, the component includes one or more superalloy components.

In a further embodiment of any of the foregoing embodiments, the component includes one or more single-crystal (SX) superalloy components.

A method according to an example embodiment of the present disclosure includes obtaining one or more three dimensional computer models that model geometric and material properties of a component, and model beam properties of a beam of radiation to be applied to the component; utilizing the one or more three dimensional computer models to obtain simulated radiation imaging data, which includes simulated elastic scattering data, resulting from a simulated application of the beam having the beam properties on a plurality of discretized samples of the component, and which accounts for sequential interactions of rays of the beam with multiple ones of the plurality of discretized samples; obtaining actual elastic scattering data of an output beam pattern caused by application of a non-simulated beam of radiation having the beam properties to the component; and determining whether an anomaly exists in a crystalline structure of the component based a comparison of the simulated elastic scattering data to the actual elastic scattering data.

In a further embodiment of the foregoing embodiment, the component includes one or more superalloy components.

In a further embodiment of any of the foregoing embodiments, the component includes one or more single-crystal (SX) superalloy components.

A method according to an example embodiment of the present disclosure includes obtaining one or more three dimensional computer models that model geometric and material properties of a component, and model beam properties of a beam of radiation to be applied to the component; utilizing the one or more three dimensional computer models to obtain simulated radiation imaging data, which includes simulated elastic scattering data, resulting from a simulated application of the beam having the beam properties on a plurality of discretized samples of the component, and which accounts for sequential interactions of rays of the beam with multiple ones of the plurality of discretized samples; obtain actual elastic scattering data of an output beam pattern caused by application of a non-simulated beam of radiation having the beam properties to the component; and modifying the actual radiation imaging data based on the simulated elastic scattering data to at least partially remove the actual elastic scattering data from the actual radiation imaging data.

In a further embodiment of the foregoing embodiment, the component includes one or more superalloy components.

In a further embodiment of any of the foregoing embodiments, the component includes one or more single-crystal (SX) superalloy components.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
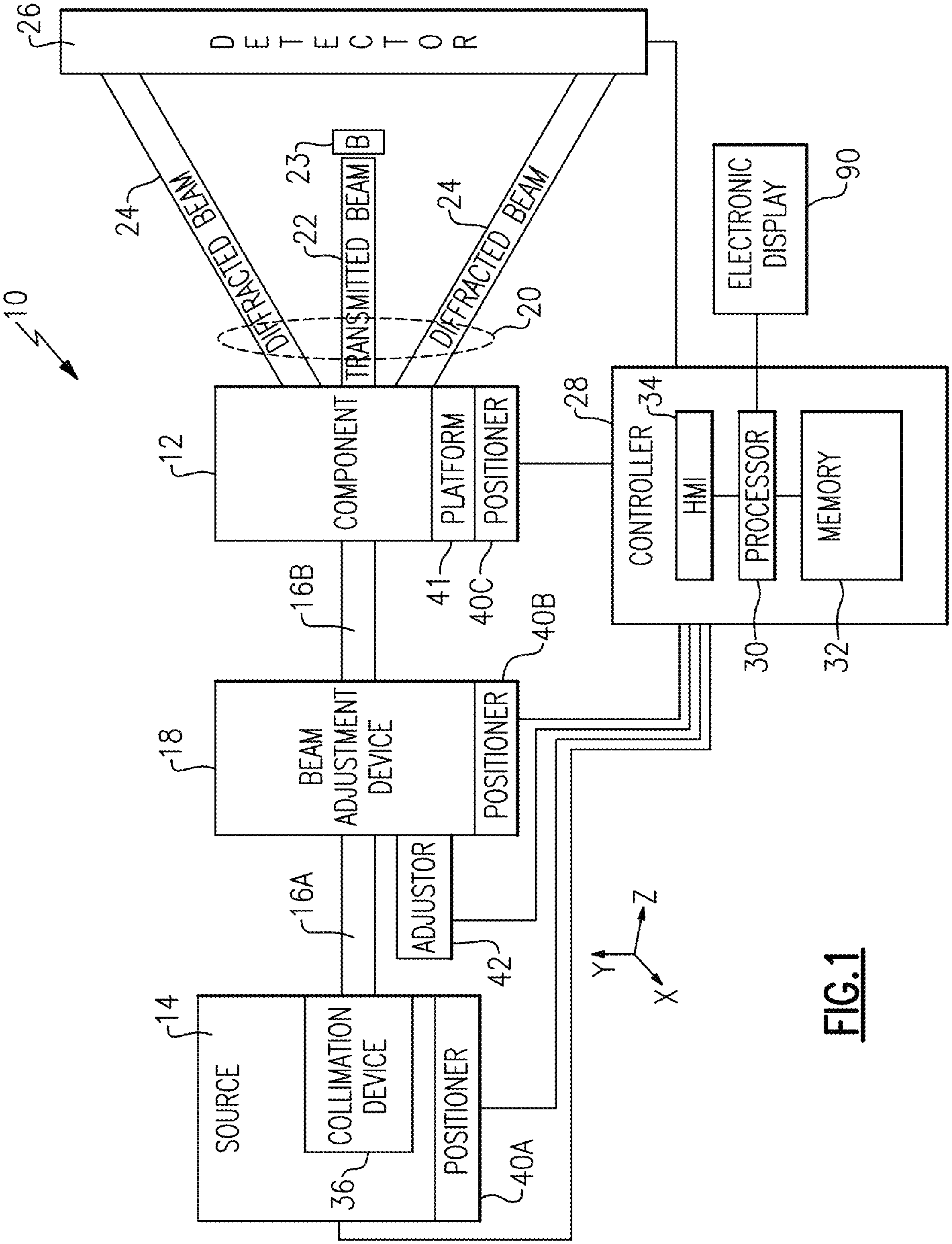
FIG. 1 schematically illustrates an example system for analyzing a component.

FIG. 1 schematically illustrates an example system 10 for analyzing a component 12 using elastic scattering. Elastic scattering refers to a technique in which radiation (e.g., X-rays) is applied to a component, and the radiation that passes through and interacts with the component is measured to analyze the component. In FIG. 1, the component 12 may be a part of a gas turbine engine, such as a rotor blade or turbine vane, for example. The component 12 has a crystalline structure (e.g., the component 12 may be a nominally single-crystal "SX" component), and the system 10 may be used to detect sub-surface crystallographic imperfections in the component 12 as part of non-destructive testing.

The system includes a radiation source 14 configured to transmit an input radiation beam 16A towards the component 12. At least a portion of the input radiation beam 16A passes through the component 12 as an output beam pattern 20 that includes a transmitted beam 22 and one or more diffracted beams 24. In one example, the input radiation is provided as an X-ray having an energy range of 30 keV-600 keV. In a further example, the energy range is 30 keV-40 keV. The radiation beam 16A may include an X-ray, for example.

A beam adjustment device 18 is disposed between the radiation source 14 and the component 12, and is configured to modify a radiation intensity profile and optionally also a shape of the input radiation beam 16A to provide a modified radiation beam 16B. As will be discussed in further detail below, the beam adjustment device 18 has an adjustable radiation transparency, which can be used to modify the radiation intensity profile of the radiation beam 16. The radiation intensity profile of the radiation beam 16 represents how radiation intensity varies in the radiation beam, and in some examples also how different regions of intensity are shaped, both of which correspondingly affect the output beam pattern 20.

The beam adjustment device 18 includes one or more plates that the input radiation beam 16 passes through. The radiation transparency of the beam adjustment device 18 is adjustable due to selection of different plates from a set of plates and/or due to modification of the density of one or more plates. By utilizing shapes with various apertures (e.g., slit-shaped apertures having a width of 100 μm to 15 cm), the beam adjustment device 18 may be utilized to provide a variety of different beam shapes, such as horizontal or vertical fan beams.

A radiation detector 26 is configured to detect the output beam pattern 20, and to provide imaging data representing the output beam pattern 20 to a controller 28. In the example of FIG. 1, a blocker 23 is positioned to at least partially block the transmitted beam 22 from reaching the radiation detector 26, in order to avoid overexposure of the imaging data that would likely otherwise occur if the transmitted beam was not blocked. Instead of blocking, a hole may be provided in the detector 26 to at least partially allow the transmitted beam to pass through, or the detector may be moved so that the radiation detector 26 is not in the path of the transmitted beam 22. The radiation detector 26 captures radiation imaging data of the output beam pattern 20 (with the transmitted beam 22 being at least partially blocked by blocker 23), and provides the radiation imaging data to the controller 28. The radiation imaging data includes elastic scattering data (which includes data from the one or more diffracted beams 24) and may also include non-elastic scattering data corresponding to radiation that is absorbed and not diffracted by the component 12).

The controller 28 includes a processor 30 operatively connected to memory 32. The processor 30 includes processing circuitry such as one or more microprocessors, microcontrollers, application specific integrated circuits (ASICs), or the like. The memory 32 may include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory 32 may incorporate electronic, magnetic, optical, and/or other types of storage media.

In one or more examples, the processor 30 is configured to compare the detected output beam pattern 20 (as represented by the imaging data received from the radiation detector 26) with a reference beam pattern stored in the memory 32, and detect whether an anomaly exists in a crystalline structure of the component 12 based on the comparison. To perform this, the processor 30 may use known techniques such as Ewald constructions and Braggs law. Some example anomalies may include recrystallized grains (RX), secondary grains, freckles, slivers grains, and misaligned primary dendrites, for example. Such defects affect the one or more diffracted beams 24, and cause the diffracted beam(s) 24 to appear differently in the imaging data captured by the radiation detector 26 than in the reference beam pattern. By utilizing these comparisons, the controller 28 facilitates for non-destructive testing of crystallographic components by using radiation and elastic scattering. The controller may be configured to display captured imaging data on electronic display 90, for example.

The radiation source 14 may include a collimation device 36 to control a size or initial shape of the input radiation beam 16A, such as controlling whether the beam 16 is provided a conical beam (and in at least one example also an angle of divergence of the conical beam) or as a parallel/pencil beam.

The controller 28 is configured to control the radiation source 14, such as whether the beam 16 is on or off, an intensity of the beam 16 (e.g., according to the energy ranges discussed above), and/or a shape of the beam 16 (e.g., parallel or non-parallel). In one or more examples, the controller 28 uses the collimation device 36 to control an initial shape of the beam 16 as discussed above.

The controller 28 is also configured to control one or more positioners 40A-C to provide a desired input radiation beam 16 with a desired radiation intensity profile to a particular portion of the component 12.

Positioner 40A is configured to move the radiation source 14 relative to the component 12 and beam adjustment device 18 along the X, Y and/or Z axes shown in FIG. 1. The positioner 40A and may be configured to move the beam 16 to provide a desired rastering pattern on the radiation detector 26, for example.

Positioner 40B is configured to control a position and/or orientation of the beam adjustment device 18 by, e.g., by moving the beam adjustment device 18 relative to the component 12 and/or radiation source 14 along X, Y, and/or Z axes as shown in FIG. 1. In one or more examples, the positioner 40B is configured to rotate a plate of the beam adjustment device 18 so that the plate (and its corresponding aperture) can be rotated using automation provided by the positioner 40B (e.g., as much as 360 degrees, which may correspond to 180 degrees counter clockwise and 180 degrees clockwise from a starting position).

Positioner 40C is configured move the component, and may be a multiple axis encoded manipulator, such as a 5-axis manipulator configured to move the component 12 in the X, Y, and/or Z axes, rotating a platform 41 on which the component 12 is situated, and/or tilting the component 12. Positioner 40C may include a clamp for clamping the component 12 to the platform 41, and/or may include one or more robotic arms for manipulating a position and/or orientation of the component 12 with respect to the input radiation beam 16.

As will be discussed in greater detail below, an adjustor 42 is provided that is configured to adjust a radiation transparency of the beam adjustment device 18.

The controller 28 includes a human machine interface ("HMI") 34 for interacting with a user, receiving a selection of a radiation intensity profile for the input radiation beam 16, and optionally also receiving a desired shape of the radiation beam. The controller 28 is configured to adjust the radiation transparency of the beam adjustment device 18 based on the selection.

Figure 2A:
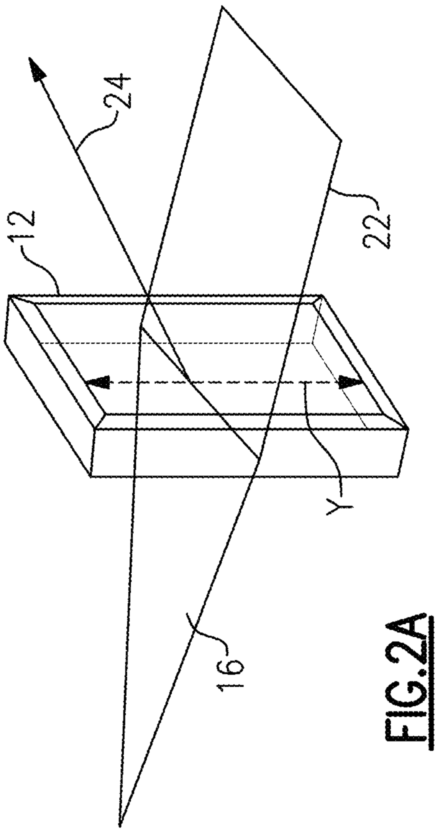
FIG. 2A schematically illustrates a first example beam configuration.

FIG. 2A illustrates a first example beam configuration in which the input radiation beam 16 is a horizontal fan beam that yields a horizontal fan transmitted beam 22 and also a diffracted beam 24. The controller 28 utilizes positioner 40A, 40B, and/or 40C to move the depicted fan beam 16 vertically along axis Y (which corresponds to axis Y of FIG. 1).

Figure 2B:
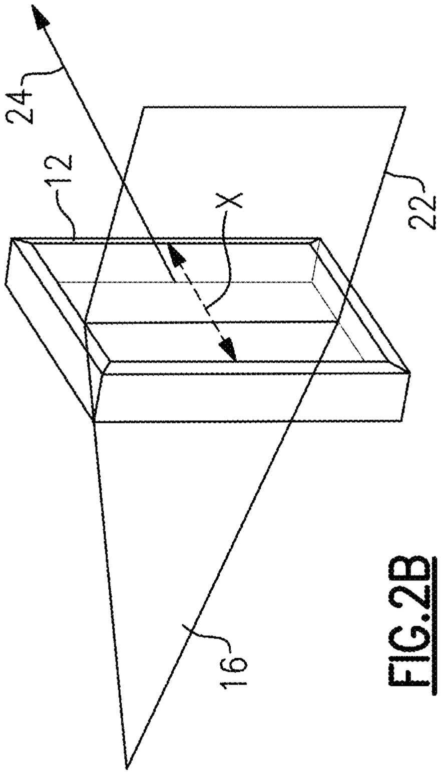
FIG. 2B schematically illustrates a second example beam configuration.

FIG. 2B illustrates a second example beam configuration in which the input radiation beam 16 is a vertical fan beam that yields a vertical fan transmitted beam 22 and also a diffracted beam 24. The controller 28 may utilize positioner 40A, 40B, and/or 40C to move the depicted fan beam 16 laterally along axis X (which corresponds to axis X of FIG. 1).

Figure 3:
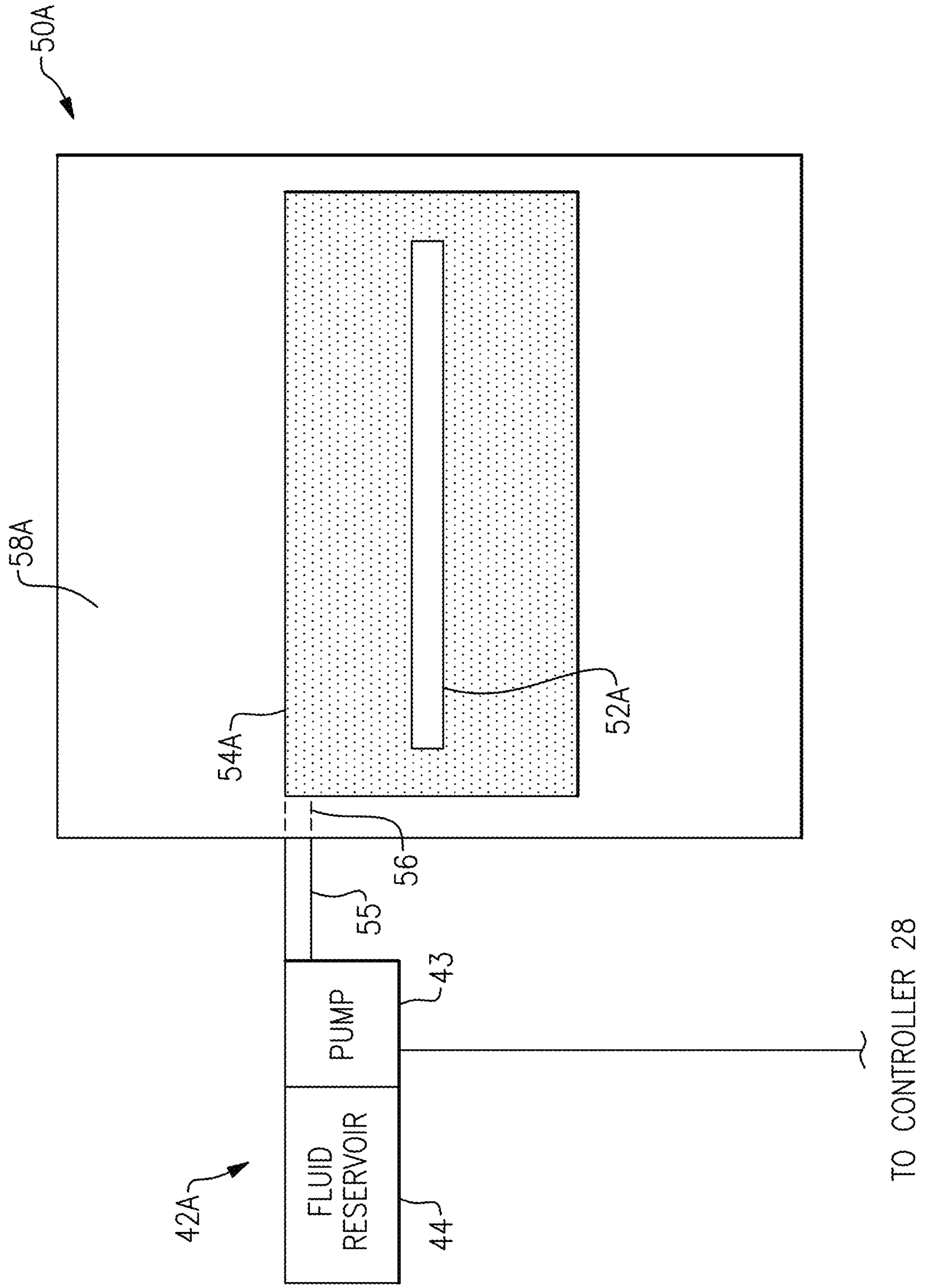
FIG. 3 schematically illustrates a first example plate that may be used in a beam adjustment device of FIG. 1.
Figure 4:
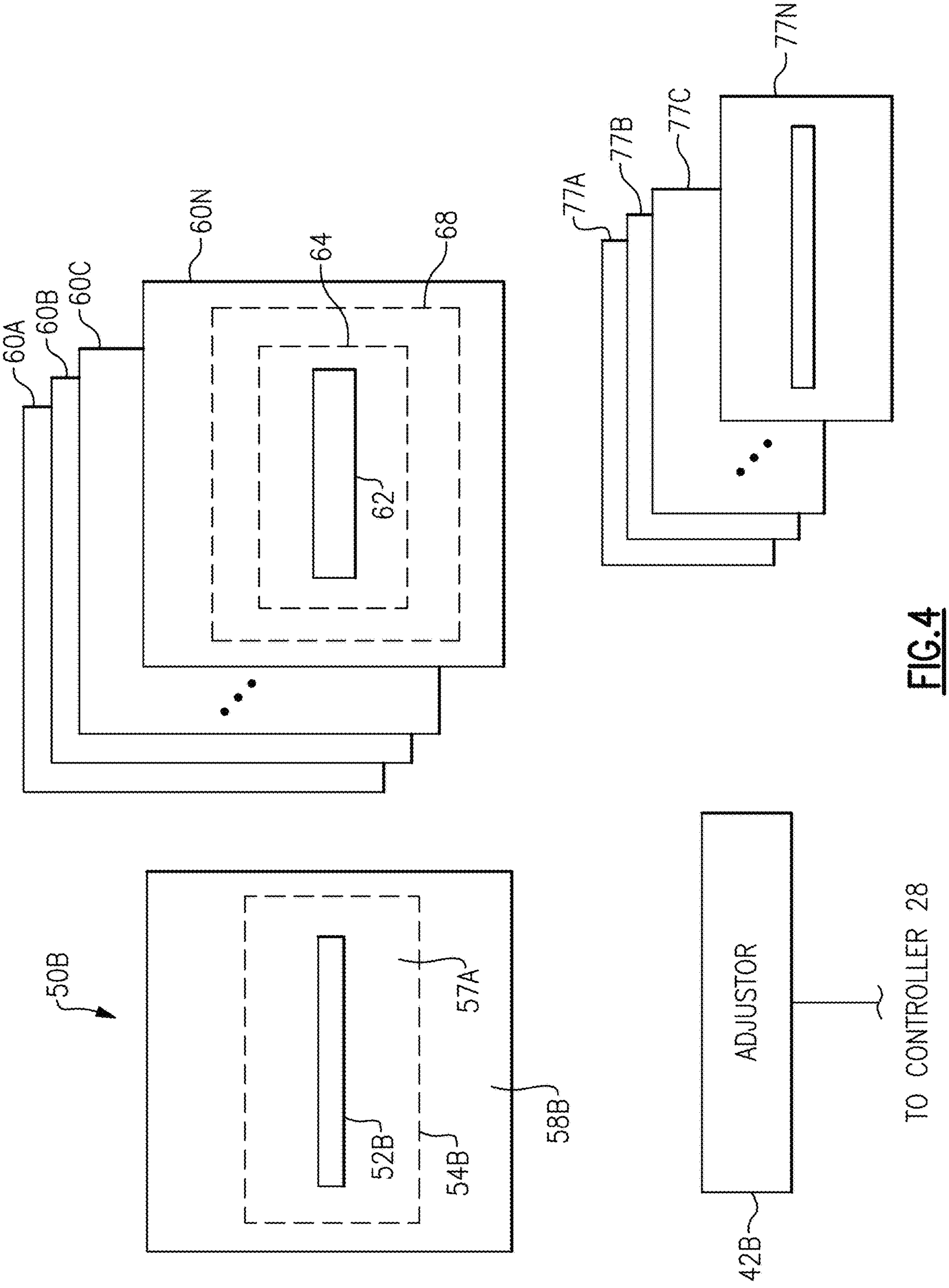
FIG. 4 schematically illustrates another example plate that may be used in the beam adjustment device of FIG. 1.

Referring now to FIGS. 3-4, an example implementation of the beam adjustment device 18 is depicted in which the beam adjustment device 18 includes a plate 50A (FIG. 3) and a plate 50B (FIG. 4), with both plates 50A-B having a respective corresponding aperture 52A-B. The controller 28 is configured to adjust the radiation transparency of a portion of the plates 50A-B that at least partially surrounds the apertures 52A-B. In these examples, a portion of the plates 50A-B that at least partially surrounds the apertures 52A-B includes a cavity 54A or an opening 54B, and the controller 28 is configured to add or remove a filler from the cavity 54A or opening 54B to adjust the radiation transparency of the cavity 54A or opening 54B. In one or more examples, the controller 28 is configured to select from one of a plurality of different fillers having different densities to achieve the selected intensity profile of the input radiation beam 16.

FIG. 3 schematically illustrates a first example plate 50A that may be used in the beam adjustment device 18 of FIG. 1. The plate 50A includes an aperture 52A that is slit-shaped and is surrounded by a cavity 54A. In the example of FIG. 3, the adjuster 42A includes a pump 43 and fluid reservoir 44, and the controller 28 is configured to adjust a radiation transparency of the cavity 54A by operating the pump 43 to pump a liquid filler from the fluid reservoir 44 into the cavity 54A through a conduit 55 and fluid passage 56.

It is known that density of a material is correlated with the radiation transparency of the material. Thus, lead, which is very dense, has a very low radiation transparency, while less dense materials, such as those containing aluminum, silicon, etc., are less dense and therefore have a relatively high radiation transparency. In one or more examples, the fluid reservoir 56 includes a plurality of fluids having different densities, and the controller 28 is configured to select a particular one of the fluids based on the radiation intensity profile selected by a user. Some example fluids that may be used include mercury, oxide slurry, heavy ion solutions, and/or metallic slurry.

The aperture 52A has a first radiation transparency R1 (e.g., 100% transparency), and the cavity 54A has a second radiation transparency R2 (which may vary depending on whether the cavity is empty or is filled with fluid from fluid reservoir 44, and also on which fluid is used to fill the cavity). An area 58A of the plate 50A that surrounds the cavity 54A has a third radiation transparency R3, where R3<R2<R1. The controller 28 may select a fluid to fill the cavity to vary the value of R2 (e.g., such that R2 changes but does not exceed R1 and does not fall below R3).

FIG. 4 schematically illustrates another example plate 50B that may be used in the beam adjustment device 18 of FIG. 1, but which uses a solid instead of a liquid filler, in the form of a filler insert 57. The plate 50B has an aperture 52B having a first radiation transparency R1' (e.g., 100% transparency), an area 54B surrounding the aperture 52B is an opening into which the filler insert 57A is situated. The filler insert 57A has a second radiation transparency R2', and an area 58B of the plate 50B that surrounds the filler insert 57A has a third radiation transparency R3'. In one example, R3'<R2'<R1'.

Assume for the discussion below that the beam adjustment device 18 is initially configured to use only plate 50B to modify the beam 16A. In this example, the adjustor 42B may adjust a radiation transparency of the beam adjustment device 18 by adding one or more additional plates of a plurality of plates 60A-N.

The additional plates 60A-N may have a variety of different configurations. For example, they may include their own apertures 62 having their own radiation transparency R1" (with their apertures 62 being sized and/or oriented the same as or different than the aperture 52B), and may also include a region 64 surrounding their apertures and having a second radiation transparency R2", which is surrounded by area 68 having a third radiation transparency R3" (e.g., where R3"<R2"<R1"). Of course, different configurations could be used, such as having the areas 64, 68 having the same or approximately the same radiation transparency. One or more of the plates 60A-N may include removable filler inserts, for example.

In one or more examples, the adjustor 42B adjusts a radiation transparency of the plate 50B by replacing the filler insert 57A with one of a plurality of additional filler inserts 77A-N that are sized to fit into the opening 54B and have a variety of different radiation transparency profiles.

The adjustor 42B may include one or more robotic arms or actuators to effect the adjustments (e.g., plate additions, plate removals, filler insert insertions, and/or filler insert removals), using known techniques for moving parts. The controller 28 in one or more examples is configured to selectively add and/or remove different plates from the beam adjustment device 18 to achieve the selected radiation intensity profile of the input radiation beam 16.

Figure 5:
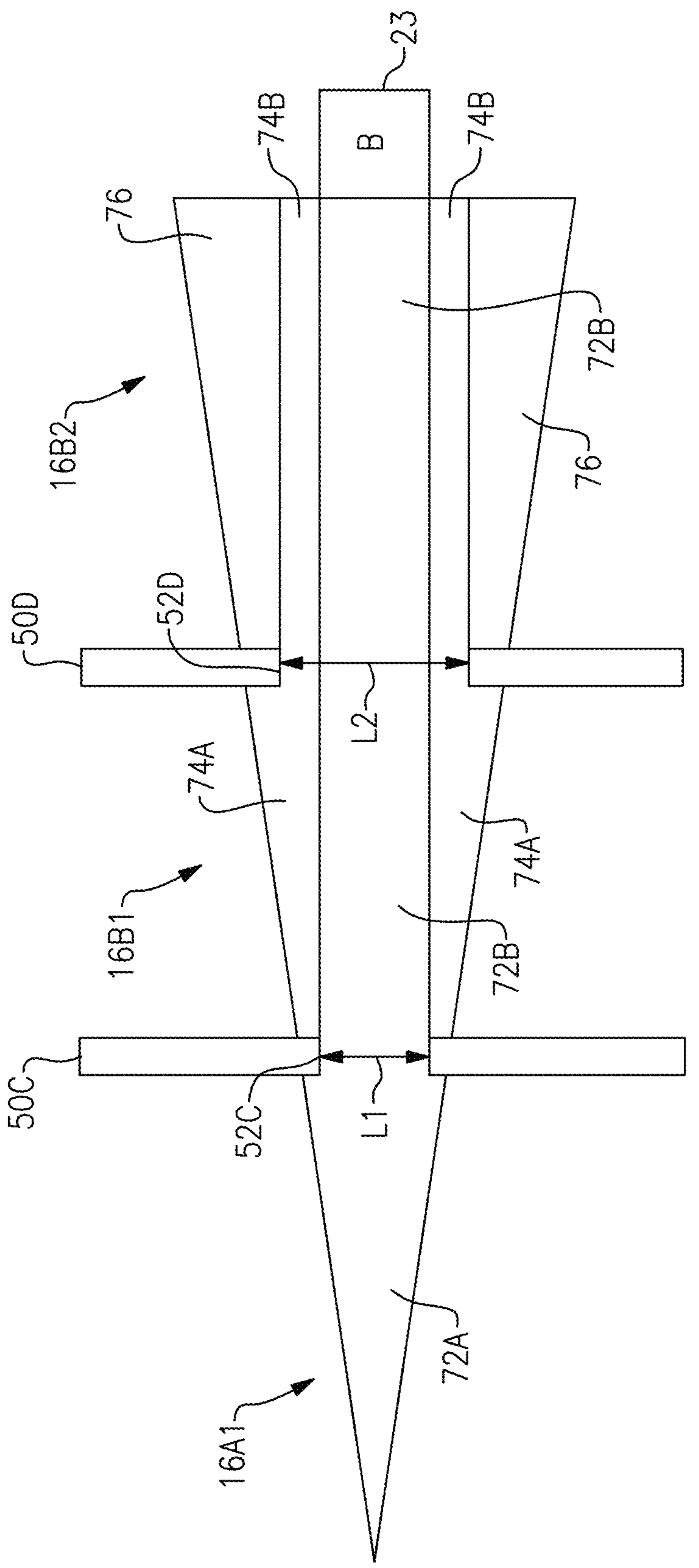
FIG. 5 schematically illustrates an example plate configuration for the beam adjustment device of FIG. 1 which utilizes a plurality of plates.

FIG. 5 schematically illustrates an example plate configuration for the beam adjustment device 18, which uses a conical input radiation beam 16A1 and a plurality of plates 50C-D. Plate 50C includes an aperture 52C having a length L1, and plate 50D includes an aperture 52D having a length L2 that is greater than L1.

The input radiation beam 16A1 has a beam area 72A having a first intensity I1. The plate 50C modifies the beam 16A1 to provide a first modified beam 16B1. In particular, the plate 50C reduces a size of the beam area 72A to an area 72B that passes through the aperture 52C and still has the intensity I1. The plate 50C also yields a beam area 74A that passes through the plate 50C around the aperture 52C, and has an intensity I2 where I2<I1.

The second plate 50D modifies the beam 16B1 to provide a second modified beam 16B2 that includes the beam area 72B (which passes through the aperture 52D), and that reduces a size of the beam area 74A to an area 74B that also passes through the aperture 52D and that still has the intensity I2. The plate 50D also yields a beam area 76 that passes through the plate 50D around the aperture 52D, and has an intensity I3 where I3<I2<I1. Additional plates could be added if desired, and the same techniques could be utilized for a parallel or "pencil" radiation beam if desired to achieve a desired radiation intensity profile. Blocker 23 may be used to block the beam area 72B from reaching the detector.

Figure 6:
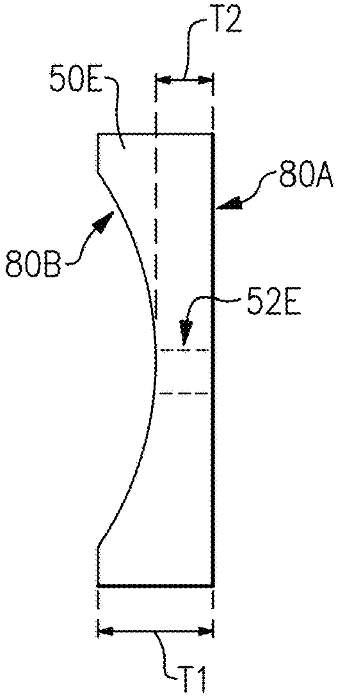
FIG. 6 schematically illustrates an example plate for the beam adjustment device of FIG. 1 having a variable width.

FIG. 6 schematically illustrates another example plate 50E that has a varying thickness and may be used in the beam adjustment device 18 of FIG. 1. The plate 50E includes an aperture 52E for the input radiation to pass through. The plate 50B includes opposing faces 80A-B. Face 80A is generally planar, and face 80B is concave, such that a thickness of the plate varies from thickness T1 at outer edges of the plate 50E to thickness T2 at the aperture 52E that is smaller than T1. By utilizing a varying thickness, the plate 50E has a varying radiation transparency as well.

Using the plate features described above, or other plate features, the adjustor 42 is operable to achieve a desired radiation intensity profile of the radiation input beam 16. Thus, the beam adjustment device 18 can achieve its adjustable radiation transparency through any one or more of the techniques discussed above, namely, selecting plates with varying thicknesses, selecting plates with different radiation transparency areas, filling plate cavities with different density liquids, or inserting filler inserts into plate openings. The beam adjustment device 18 may use a single plate, or multiple stacked plates (which may abut each other, or may be spaced apart from each other along the axis Z of FIG. 1, for example).

Although only slit apertures are primarily shown above, it is understood that other aperture geometries could be used, to correspondingly control the shape of the various beam areas (e.g., beam areas 72B, 74B, and 76 in FIG. 5).

Figure 7:
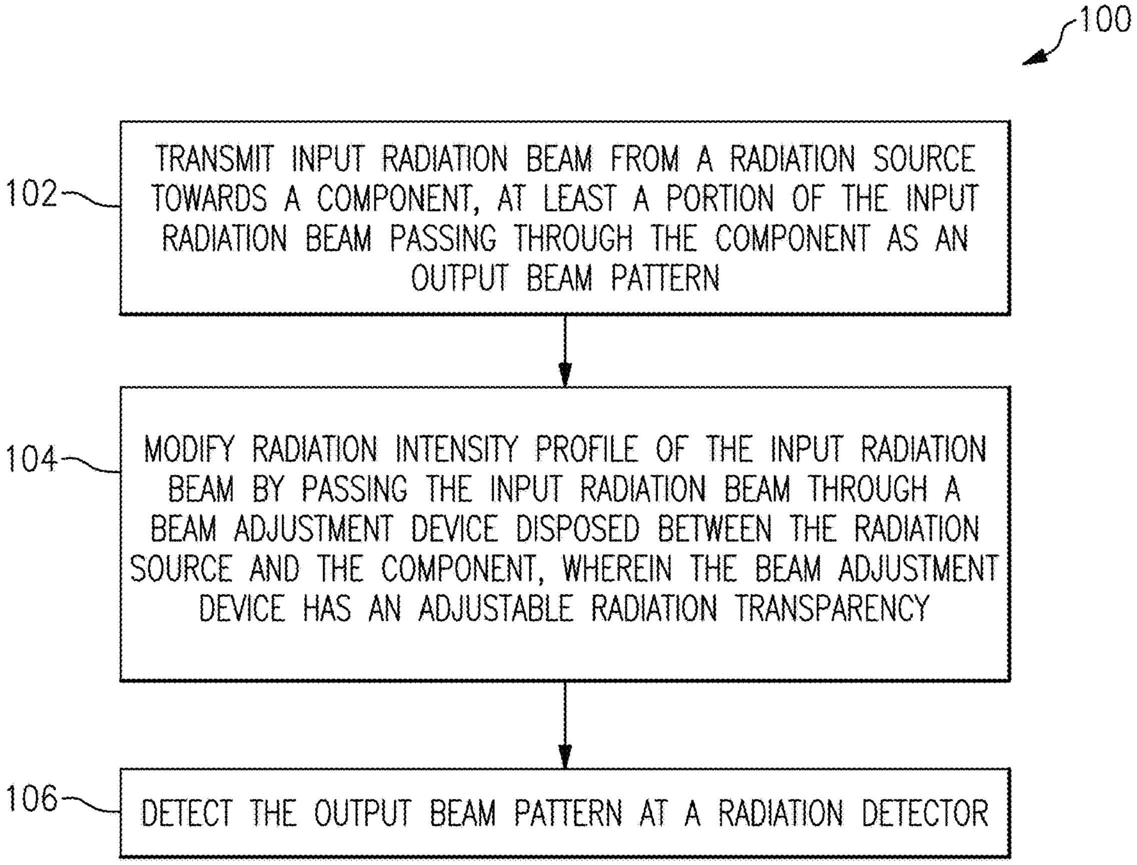
FIG. 7 is a flow chart of an example method of analyzing a component.

FIG. 7 is a flow chart of an example method 100 of analyzing a component 12. The method 100 may be implemented by the controller 28, for example.

An input radiation beam 16A is transmitted from radiation source 14 towards the component 12 (step 102), with at least a portion of the input radiation beam 16A passing through the component 12 as an output beam pattern 20.

A radiation intensity profile, and optionally also a shape, of the input radiation beam 16A is modified by passing the input radiation beam 16A through beam adjustment device 18 disposed between the radiation source 14 and the component 12 (step 104), wherein the beam adjustment device 18 has an adjustable radiation transparency. As a result of step 104, the modified input radiation beam 16B is provided. The output beam pattern 20 is detected at the radiation detector 26 (step 106).

The method 100 may include receiving a selection of a desired radiation intensity profile (and optionally also beam shape) for the input radiation beam 16 (e.g., through HMI 34), and adjusting the shape and/or radiation transparency of the input radiation beam 16 based on the selection.

The method 100 may include adjusting the radiation transparency of a portion of the plate that at least partially surrounds the aperture, such as the cavity 54 of FIG. 3 (e.g., by adding or removing a filler from the cavity to adjust the radiation transparency of the cavity 54).

Figure 8:
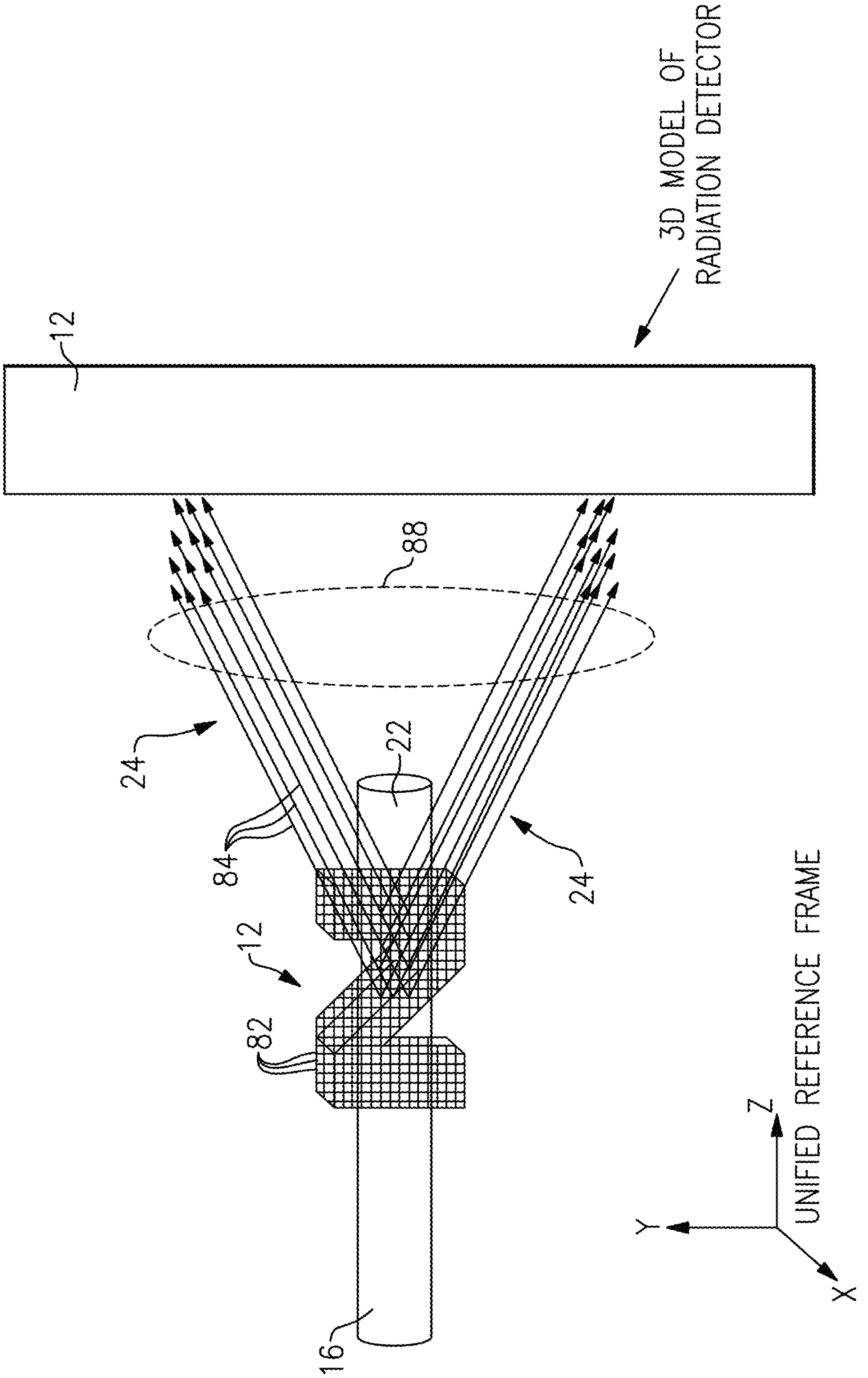
FIG. 8 schematically illustrates an example of how simulated elastic scattering data may be obtained from a component.

FIG. 8 schematically illustrates an example of how simulated elastic scattering data may be obtained from the component 12. One of more 3D models 86 (see FIG. 1) are obtained of the radiation beam 16, of geometric and material properties of the component 12 (as represented by a plurality of discretized samples 82), and of the radiation detector 12. The discretized samples 82 may come from Computer Aided Design (CAD) software, or from tomography data, for example. As shown in FIG. 1, the one or more 3D models may be stored in memory 32 of the controller 28.

The beam properties that are modeled by the one or more three 3D computer models 86 may include one or more of the following, in any combination:

- an energy spectrum of the beam 16 (e.g., a wavelength);
- a shape of the beam 16 (e.g., is the beam conical or a parallel/pencil beam);
- an axial divergence of the beam 16 (i.e., an angle at which the beam diverges as it emanates from the radiation sourced 14);
- a distance between the component 12 and the radiation source 14 of the beam 16; and/or
- ray tracing data of the beam 16 expressed in a unified reference frame (e.g., the XYZ frame provided in FIG. 1), which models how the radiation (X-rays) interacts with the a model, and tracks which portion of the 3D model of the component each ray of the radiation beam 16 is interacting with.

The geometric properties of the component 12 that are modeled by the one or more 3D computer models 86 may include one or more of the following, in any combination:

- a material density of the component 12;
- a chemical composition of the component 12;
- an orientation of the component 12 with respect to the non-simulated radiation beam 16;
- spatial coordinates and a size of each discretized sample 82 of the component 16;
- which locations of the component 16 are to be analyzed;
- a crystalline structure of the component 12, including a lattice and basis of the crystalline structure;

an orientation of crystals of the component 12 with respect to a unified reference frame (e.g., the XYZ frame provided in FIG. 1);

a permissible grain divergence of the component 12; and/or a structure factor of the component 12.

At each discretized sample unit 82, diffraction events are simulated (e.g., using Bragg's Equation and/or an Ewald Construction) to obtain simulated radiation data 88, which includes elastic scattering data representing a diffraction pattern/diffraction intensity distribution. A crystal structure of the sample unit 82 (e.g., lattice and basis) is used to compute a structure factor (diffracted intensity) of one or more refracted beams 84.

The simulated radiation data 88 includes one or more of the following for each of the plurality of discretized samples 82: a brightness of a refracted beam 84, and an angle of the refracted beam 84 relative to a unified reference frame (e.g., the XYZ frame provided in FIG. 1).

A 3D model is created of a diffracted intensity distribution of the various diffracted rays/beams 84 from the various discretized units 82 that sums all of the diffracted rays. This 3D model may also be expressed in a unified reference frame (e.g., the XYZ frame provided in FIG. 1). The various diffracted ray intensities are adjusted for an absorption contribution as they move through the other discretized units 82 (e.g., adjacent ones of the discretized units 82). To elaborate, as a diffracted beam moves through the component 12, it may sequentially interact with a plurality of the discretized samples 82 (e.g., diffracting from a first sample 82, and then becoming partially absorbed and less diffracted through subsequent samples 82). The techniques discussed below account for these sequential interactions.

An intersection between the 3D model of the radiation detector 12 and ray tracing of the diffracted intensity distribution creates a simulated version of the expected/acceptable diffracted intensity distribution. This too may be expressed in a unified reference frame (e.g., the XYZ frame provided in FIG. 1). The 3D model of the radiation detector 26 models a size, shape, and location of the radiation detector 26, and may also model its efficiency (e.g., what percentage of X-rays that hit the detector are actually measured) as a function of wavelength (e.g., X-ray wavelength).

Figure 9:
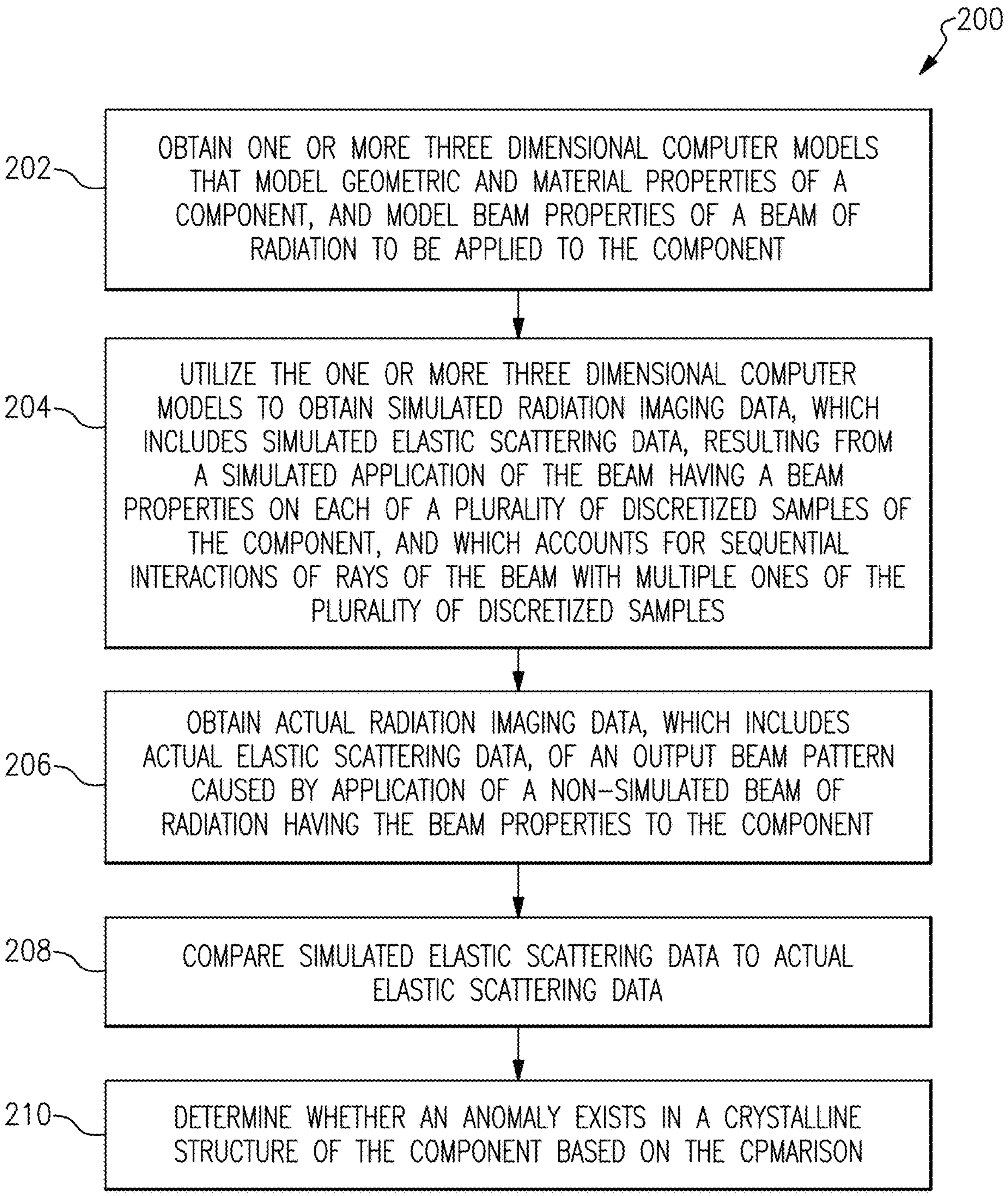
FIG. 9 is a flow chart of an example elastic scattering method.

FIG. 9 is a flow chart of an example elastic scattering method 200 for analyzing the component 12. The method may be performed by the controller 28, for example. One or more three dimensional (3D) computer models 86 (see FIG. 1) are obtained that model geometric and material properties of a component 12, and model beam properties of the beam 16 of radiation to be applied to the component 12 (step 202). The one or more 3D computer models 86 may also model the radiation detector 26 as discussed above.

The one or more 3D computer models are utilized to obtain simulated radiation imaging data, which includes simulated clastic scattering data, resulting from a simulated application of the beam having the beam properties on a plurality of discretized samples of the component, and which accounts for sequential interactions of rays of the beam with multiple ones of the plurality of discretized samples (step 204). Actual radiation imaging data, which includes actual elastic scattering data, is obtained of an output beam pattern caused by application of a non-simulated radiation beam 16 having the beam properties to the component 12 (step 206). The actual elastic scattering data includes actual diffraction data of diffracted radiation beams from the component 12, and also includes actual absorption data of radiation that is at least partially absorbed as it travels through the component 12.

The simulated elastic scattering data is compared to the actual elastic scattering data (step 208), and a determination is made of whether an anomaly exists in a crystalline structure of the component 12 based the comparison of step 208 (step 210).

The permissible grain divergence of the component 12 may be utilized as a threshold for determining whether the component 12 includes an anomaly (e.g., a defect) in step 210.

Step 210 may include automatically identifying diffraction spots which correspond to defects, estimating defect grain size by diffraction spot shape and size, and/or identifying positions of defect indications on the component 12.

In one example, utilizing the one or more 3D computer models 86 to obtain a simulated diffraction pattern in step 204 includes utilizing at least one of Bragg's Equation and an Ewald Construction to simulate a diffraction event caused by application of the beam 16 to each discretized sample 82 of the component 12.

Figure 10:
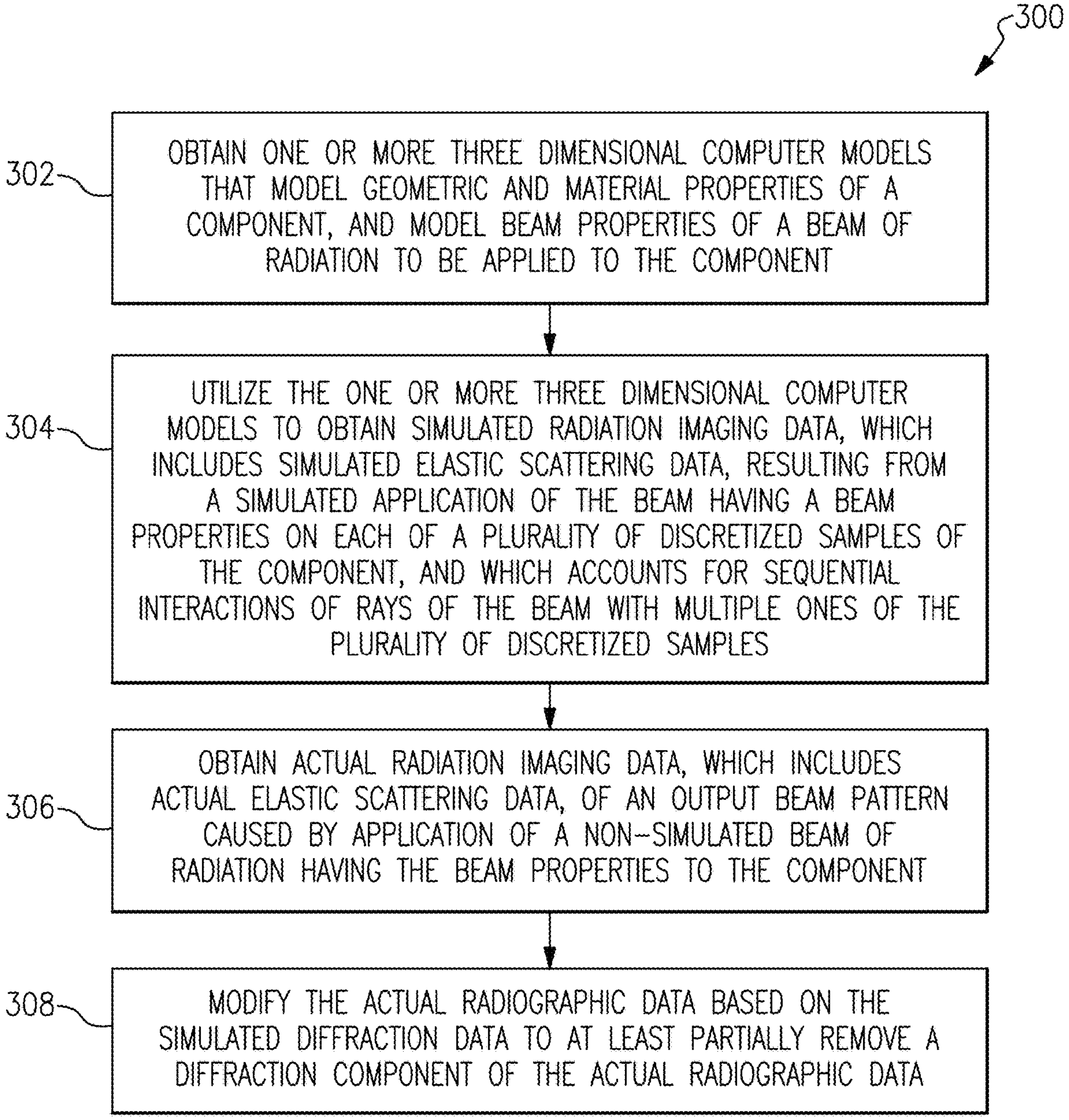
FIG. 10 is a flow chart of another example elastic scattering method.

FIG. 10 is a flow chart of another example elastic scattering method 300. The method may be performed by the controller 28, for example. Steps 302, 304, and 306 are the same as steps 202, 204, and 206, respectively, of the method 200. After those steps, the actual radiation imaging data is modified based on the simulated elastic scattering data to at least partially remove the actual elastic scattering data from the actual radiation imaging data (step 308).

As a result of step 308, in the data set of actual elastic scattering data, there is a greater emphasis on the actual absorption data because the actual diffraction data has been at least partially removed.

It is known that diffracted beams in elastic scattering data may cause a halo effect which may obscure an absorption component of the elastic scattering data. By performing the modification of step 308, the actual radiation imaging data can be cleaned up and improved, to mitigate the halo effect and provide greater emphasis on the absorption component of the actual radiation data.

In one or more examples, the modifying in step 308 includes subtracting the simulated elastic scattering data from the actual radiation imaging data. The subtracting may include, for each of a plurality of groups of one or more pixels of radiation data, subtracting the intensity of the simulated elastic scattering data from the actual radiation imaging data of the group of one or more pixels.

In one or more examples, the method 300 includes displaying the modified actual elastic scattering data on an electronic display 90 (see FIG. 1) (e.g., upon receiving a request from a user at the HMI 34 to clean up the non-simulated elastic scattering data).

Known X-ray analysis techniques have utilized a simplistic analytical technique that does not account for sequential interactions of an X-ray with a series of discretized samples, resulting in an output that is correspondingly simplistic and consists of largely discrete diffraction estimates, without including a diffraction dot spread that accurately represents the shape of diffraction intensity areas. The analysis discussed in connection with FIGS. 9 and 10, in contrast, incorporates the full spatial extent and complex geometry of object interacting with X-rays to create a complex and full picture of expected radiation data. This accounts for the shape and distribution of detected elastic scattering data, and enables detection of subtle differences in the detected radiation data due to small or subtle defects.

Exemplary components suitable for inspection and analysis using the present invention include superalloy components, including single-crystal (SX) superalloy components. However, the present invention however is not limited to such components or materials.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A method, comprising:

obtaining one or more three dimensional computer models that model geometric and material properties of a component, and model beam properties of a beam of radiation to be applied to the component;

utilizing the one or more three dimensional computer models to obtain simulated radiation imaging data, which includes simulated elastic scattering data, resulting from a simulated application of the beam having the beam properties on a plurality of discretized samples of the component, and which accounts for sequential interactions of rays of the beam with multiple ones of the plurality of discretized samples;

obtaining actual radiation imaging data, which includes actual elastic scattering data, of an output beam pattern caused by application of a non-simulated beam of radiation having the beam properties to the component; and performing at least one of:

determining whether an anomaly exists in a crystalline structure of the component based a comparison of the simulated elastic scattering data to the actual elastic scattering data; and modifying the actual radiation imaging data based on the simulated elastic scattering data to at least partially remove the actual elastic scattering data from the actual radiation imaging data.

2. The method of claim 1, wherein the beam properties that are modeled by the one or more three dimensional computer models include one or more of:

an energy spectrum of the beam;

a shape of the beam;

an axial divergence of the beam;

a distance between the component and a source of the beam; and ray tracing data of the beam.

3. The method of claim 1, wherein the geometric properties of the component that are modeled by the one or more three dimensional computer models include one or more of:

a material density of the component;

a chemical composition of the component;

an orientation of the component with respect to the non-simulated radiation beam;

spatial coordinates and a size of each discretized sample of the component; and which locations of the component are to be analyzed.

4. The method of claim 3, wherein the geometric properties of the component that are modeled by the one or more three dimensional computer models also include one or more of:

a crystalline structure of the component, including a lattice and basis of the crystalline structure;

an orientation of crystals of the component with respect to a unified reference frame;

a permissible grain divergence of the component; and a structure factor of the component.

5. The method of claim 1, wherein the simulated diffraction pattern includes one or more of the following for each of the plurality of discretized samples:

a brightness of a refracted beam; and an angle of the refracted beam relative to a unified reference frame.

6. The method of claim 1, wherein said utilizing the one or more three dimensional computer models to obtain a simulated diffraction pattern comprises:

Utilizing at least one of Bragg's Equation and an Ewald Construction to simulate an elastic scattering event caused by application of the beam to each discretized sample of the component.

7. The method of claim 1, wherein said modifying the actual radiation imaging data based on the simulated elastic scattering data to at least partially remove the actual elastic scattering data comprises:

subtracting the simulated elastic scattering data from the actual radiation imaging data.

8. The method of claim 7, wherein:

said subtracting the simulated elastic scattering data from the actual radiation imaging data comprises, for each of a plurality of groups of one or more pixels, subtracting the intensity of the simulated elastic scattering data from the actual radiation imaging data of the group of one or more pixels.

9. The method of claim 1, comprising:

displaying the modified actual elastic scattering data on an electronic display.

10. The method of claim 1, wherein the component comprises one or more superalloy components.

11. The method of claim 1, wherein said performing at least one of said determining and said modifying comprises performing said determining.

12. The method of claim 1, wherein said performing at least one of said determining and said modifying comprises performing said modifying.

13. A system, comprising:

a computing device comprising processing circuitry operatively connected to memory, the processing circuitry configured to:

obtain one or more three dimensional computer models that model geometric and material properties of a component, and model beam properties of a beam of radiation to be applied to the component;

utilize the one or more three dimensional computer models to obtain simulated radiation imaging data, which includes simulated elastic scattering data, resulting from a simulated application of the beam having the beam properties on a plurality of discretized samples of the component, and which accounts for sequential interactions of rays of the beam with multiple ones of the plurality of discretized samples;

obtain actual radiation imaging data, which includes actual elastic scattering data, of an output beam pattern caused by application of a non-simulated beam of radiation having the beam properties to the component; and perform at least one of:

determine whether an anomaly exists in a crystalline structure of the component based a comparison of the simulated elastic scattering diffraction data to the actual elastic scattering data; and modify the actual radiation imaging data based on the simulated elastic scattering data to at least partially remove the actual elastic scattering data from the actual radiation imaging data.

14. The system of claim 13, wherein the beam properties that are modeled by the one or more three dimensional computer models include one or more of:

an energy spectrum of the beam;

a shape of the beam;

an axial divergence of the beam;

a distance between the component and a source of the beam; and ray tracing data of the beam.

15. The system of claim 13, wherein the geometric properties of the component that are modeled by the one or more three dimensional computer models include one or more of:

a material density of the component;

a chemical composition of the component;

an orientation of the component with respect to the non-simulated radiation beam;

spatial coordinates and a size of each discretized sample of the component; and which locations of the component are to be analyzed.

16. The system of claim 15, wherein the geometric properties of the component that are modeled by the one or more three dimensional computer models also include one or more of:

a crystalline structure of the component, including a lattice and basis of the crystalline structure;

an orientation of crystals of the component with respect to a unified reference frame;

a permissible grain divergence of the component; and a structure factor of the component.

17. The system of claim 13, wherein the simulated diffraction pattern includes one or more of the following for each of the plurality of discretized samples:

a brightness of a refracted beam; and an angle of the refracted beam relative to a unified reference frame.

18. The system of claim 13, wherein to utilize the one or more three dimensional computer models to obtain a simulated diffraction pattern, the processing circuitry is configured to utilize at least one of Bragg's Equation and an Ewald Construction to simulate an elastic scattering event caused by application of the beam to each discretized sample of the component.

19. The system of claim 13, wherein to modify the actual radiation imaging data based on the simulated elastic scattering data to at least partially remove the actual elastic scattering data, the processing circuitry is configured to:

subtract simulated elastic scattering data from the actual radiation imaging data.

20. The system of claim 13, wherein:

to subtract the simulated elastic scattering data from the actual radiation imaging data, the processing circuitry is configured to, for each of a plurality of groups of one or more pixels, subtract the intensity of the simulated elastic scattering data from actual radiation elastic scattering data of the group of one or more pixels.

* * * * *